United States Patent [19]

Nuber et al.

[11] Patent Number: 5,598,415
[45] Date of Patent: Jan. 28, 1997

[54] TRANSMISSION OF HIGH RATE ISOCHRONOUS DATA IN MPEG-2 DATA STREAMS

[75] Inventors: Ray Nuber, La Jolla; Paul Moroney, Olivenhain, both of Calif.

[73] Assignee: General Instrument Corporation of Delaware, Chicago, Ill.

[21] Appl. No.: 511,266

[22] Filed: Aug. 4, 1995

[51] Int. Cl.⁶ .................................................. H04J 3/00
[52] U.S. Cl. ........................... 370/474; 370/522; 348/465
[58] Field of Search .................. 370/84, 118, 94.1–94.3, 370/110.1, 100.1, 105.1, 112; 348/465, 464, 467; 375/354

[56] References Cited

U.S. PATENT DOCUMENTS

| | | | |
|---|---|---|---|
| 5,121,205 | 6/1992 | Ng et al. | 348/367 |
| 5,365,272 | 11/1994 | Siracusa | 348/426 |
| 5,425,101 | 6/1995 | Woo et al. | 370/60 |
| 5,467,342 | 11/1995 | Logston et al. | 370/17 |
| 5,473,385 | 12/1995 | Leske | 348/464 |
| 5,481,542 | 1/1996 | Logston et al. | 370/94.2 |
| 5,481,543 | 1/1996 | Vettman | 348/465 |
| 5,493,339 | 2/1996 | Birch et al. | 348/467 |

*Primary Examiner*—Douglas W. Olms
*Assistant Examiner*—Ajit Patel
*Attorney, Agent, or Firm*—Barry R. Lipsitz

[57] ABSTRACT

A scheme is provided for communicating high rate isochronous data in an MPEG-2 type transport stream in a robust manner. The syntax for the data bitstream also provides for the communication of a data clock increment value to a decoder. The increment value enables a simplified and cost effective approach to the direct digital synthesis of a clock frequency necessary to recover data from the packetized data stream at the decoder. The time resolution for presenting isochronous data presentation units at the decoder is increased by providing a presentation time stamp (PTS) extension to supplement a standard MPEG-2 PTS.

22 Claims, 3 Drawing Sheets

FIG. 4

TRANSMISSION OF HIGH RATE ISOCHRONOUS DATA IN MPEG-2 DATA STREAMS

This application is a §111(a) application based on copending U.S. provisional application Ser. No. 60/015,392, filed on Jul. 13, 1995.

BACKGROUND OF THE INVENTION

The present invention relates to a method and apparatus for communicating data via a packetized data stream, and more particularly to the transmission of high rate isochronous data in an MPEG-2 data stream. The invention also provides for the communication of a data clock increment value to a decoder to provide a simplified and cost effective approach to the direct digital synthesis (DDS) of a clock frequency necessary to recover data from the packetized data stream at the decoder.

Various standards have emerged for the transport of digital data, such as digital television data. Examples of such standards include the Motion Picture Experts Group standard referred to as MPEG-2 and the DigiCipher® II standard proprietary to General Instrument Corporation of Chicago, Ill., U.S.A., the assignee of the present invention. The DigiCipher II standard is similar and inclusive of various aspects of the MPEG-2 standard, which is widely known and recognized as a video and audio compression specification sanctioned by the International Standards Organization (ISO) in Document ISO 13818.

In addition to the video and audio compression features, the MPEG-2 specification also contains a systems "layer" that provides a transmission medium independent coding technique to build bitstreams containing one or more MPEG programs. The MPEG coding technique uses a formal grammar ("syntax") and a set of semantic rules for the construction of bitstreams to be transmitted. The syntax and semantic rules include provisions for multiplexing, clock recovery, synchronization and error resiliency. For purposes of this disclosure, any data stream that is coded similarly to that of an MPEG-2 transport stream is referred to as an "MPEG-2 type transport stream." One example, but by no means the only such MPEG-2 type transport stream, is a data stream provided in accordance with the DigiCipher II standard. Other such standards are expected to be promulgated in the future.

The MPEG-2 transport stream is specifically designed for transmission in conditions that can generate data errors. MPEG transport packets each have a fixed length of 188 bytes. Many programs, each with different components, may be combined in a transport stream. Examples of services that can be provided using the MPEG format are television services broadcast over terrestrial, cable television and satellite networks as well as interactive telephony-based services. The syntax and semantics of the MPEG-2 transport stream are defined in the International Organisation for Standardisation, ISO/IEC 13818-1, International Standard, 13 Nov. 1994 entitled "Generic Coding of Moving Pictures and Associated Audio: Systems," recommendation H.222.0, and ISO/IEC 13818-2, International Standard, 1995 entitled "Generic Coding of Moving Pictures and Associated Audio: Video," recommendation H 262, both incorporated herein by reference.

Multiplexing according to the MPEG-2 standard is accomplished by packaging raw elementary streams such as coded video and audio into packetized elementary stream (PES) packets which are then inserted into transport packets. As noted above, each MPEG transport packet is fixed at 188 bytes in length. The first byte is a synchronization byte having a unique eight-bit pattern, e.g., 01000111. The sync byte is used to locate the beginning of each transport packet.

Following the sync byte is a three-byte prefix which includes a one-bit transport packet error indicator, a one-bit payload unit start indicator, a one-bit transport priority indicator, a 13-bit packet identifier (PID), a two-bit transport scrambling control, a two-bit adaptation field control, and a four-bit continuity counter. Use of the sync byte and three-byte prefix leaves up to 184 bytes of payload which carry the data to be communicated. An optional adaptation field may follow the prefix for carrying both MPEG related and private information of relevance to a given transport stream or the elementary stream carried within a given transport packet. Provisions for clock recovery, such as a program clock reference (PCR) and splicing control are typical of the information carried in the adaptation field. By placing such information in an adaptation field, it becomes encapsulated with its associated data to facilitate remultiplexing and network routing operations. When an adaptation field is used, the payload is correspondingly shorter.

The PCR is a count which reflects the value of the system time clock (STC) for the associated program at the time the PCR bytes were inserted into the transport stream. The decoder uses the PCR to synchronize a decoder time clock with the encoder system clock. The lower nine bits of the 42-bit PCR provide a modulo-300 counter that is incremented at a 27 MHz clock rate (the "system clock rate"). At each modulo-300 rollover, the count in the upper 33 bits is incremented, such that the upper bits represent counts that occur at a 90 kHz rate. This enables presentation time-stamps (PTS) and decoding time-stamps (DTS) to be compared using the 90 kHz value. Since each program or service carried by the data stream may have its own PCR, the programs and services can be multiplexed asynchronously.

Synchronization of audio, video and data within a program is accomplished using a time stamp approach. Presentation time-stamps and decoding time-stamps are inserted into the transport stream for the separate video and audio packets. The PTS and DTS information is used by the decoder to determine when to decode and display a picture and when to play an audio segment. As indicated above, the PTS and DTS values are tied to the same clock established by the PCRs, but are limited by the MPEG-2 standard to a time resolution of 11.1 microseconds. This resolution is limited by the PTS resolution of 90 kHz ticks, provided by the upper 33 bits of the PCR. This limitation precludes the transport of generalized "high rate" data which is robust to timing errors, e.g., data rates not integer related to 90 kbps, using the same approach provided for video and audio information in a standard MPEG-2 type transport stream.

MPEG-2 data, such as compressed video and audio data, must be formatted into a packetized elementary stream (PES) formed from a succession of PES packets. Each PES packet includes a PES header followed by a payload. The PES packets are then divided into the payloads of successive fixed length transport packets.

PES packets are of variable and relatively long length. Various optional fields, such as the presentation time-stamps and decoding time-stamps may follow the PES header. When the transport packets are formed from the PES, the PES headers are aligned with the transport packet headers. A single PES packet may span many transport packets and the subsections of the PES packet must appear in consecutive transport packets of the same PID value. It should be appreciated, however, that these transport packets may be freely interleaved with other transport packets having different PIDs and carrying data from different elementary streams.

Video services are carried by placing coded MPEG video streams into PES packets which are then divided into transport packets for insertion into a transport stream. Each video PES packet contains all or part of a coded video picture, referred to as a video "access unit." PTS and DTS data are placed into the PES packet header that encapsulates the associated access unit. The PTS is used to actuate the decoder to present (e.g., "display") the associated access unit. The DTS indicates when the decoder should decode the access unit.

Audio services are provided in accordance with the MPEG standard using the same specification of the PES packet layer. PTS data is attached to those packets that include audio frame boundaries. Such boundaries are defined by audio sync words. An audio frame is defined as the data between two consecutive audio sync words.

In order to reconstruct a television signal from the video and audio information carried in an MPEG-2 type (e.g., MPEG-2 or DigiCipher II) transport stream, a decoder is required to process the video packets for output to a video decompression processor (VDP) and the audio packets for output to an audio decompression processor (ADP). It is also possible to transmit other types of data in such a transport stream. For example, private data to provide services such as teletext, stock quotes and other information can be carried as separate transport packets derived from a separate packetized elementary stream. Asynchronous data pipes can be supported as well; such a pipe would represent an RS-232 style output from the decoder with the equivalent input to an encoder. Such information service transport packets would be multiplexed with the MPEG video and audio packets in a final multiplex transmitted, e.g., via satellite or cable.

It would be advantageous to also carry "isochronous" data using an MPEG-2 type format. Isochronous data is high rate data delivered at the edges of a regular clock and is distinguished from bursty "synchronous" data which may arrive with an irregular clock. Thus, isochronous data carries a jitter specification and the clock can be restored with a simple phase lock loop (PLL). In general, an isochronous data component is one in which data bits are delivered at essentially regular rates, with an accompanying clock. Any deviation from the regular (isochronous) rate would be covered by the allowed jitter specification. Such data may be used for any number of a large range of "data pipe" applications. One example is the transport of the contents of a T1 digital (i.e., telephone data line) data stream. Such data streams operate at 1,554 Mbps. Other applications include, but are not limited to, business network data, general high speed data communications, and virtually any other data service requiring constant delay data transmission rates that exceed those generally available using asynchronous communication techniques or are not appropriate for variable delay. These applications are characterized by a general intolerance of "bit slips." That is, errors are tolerated, but resynchronization involving net shifts of the bitstream cause large outages to the ultimate data synchronization.

In the MPEG-2 standard, the presentation time-stamps are only able to point to presentation units (i.e. 8-bit bytes of data "presented" to the decoder) at a resolution of 11.1 microseconds. This limitation results from the 90 kHz rate established by the upper bits of the PCR count used to produce the presentation time-stamps. With high speed isochronous data, it may be necessary to resolve presentation units with a higher resolution, especially for purposes of error recovery. Specifically, it is necessary to be capable of presenting presentation units unambiguously in time to support continuously variable rates. Therefore, it would be advantageous to increase the time resolution of the presentation time-stamps over that provided by a standard MPEG-2 implementation. For example, it would be advantageous to provide a scheme for increasing the PTS time resolution to allow the robust transport of isochronous data or the like at rates up to 9.0 Mbps or more.

It would be further advantageous to provide a scheme for simplifying a data receiver to provide the appropriate clock rates based on a system clock frequency, in order to recover data from a data stream. In particular, it would be advantageous to provide a scheme in which the receiver would be able to provide a clock at any desired information data rate from, e.g., 19.2 kbps to 9 Mbps for use in outputting isochronous information data, via DDS.

The present invention provides a method and apparatus for transmitting and receiving data in an MPEG-2 type transport stream having the aforementioned and other advantages.

SUMMARY OF THE INVENTION

In accordance with the present invention, a method is provided for the robust transmission of high rate isochronous data in an MPEG-2 type transport stream. Isochronous data is provided in a packetized elementary stream (PES) having a PES header preceding a PES payload. The PES payload includes an isochronous data header followed by a plurality of isochronous data presentation units. The isochronous data header and the presentation units which follow within the PES are aligned such that the first byte of the isochronous data header immediately follows the last byte of the PES header. A clock increment value is inserted in said isochronous data header specifying the ratio of said isochronous data rate to a reference clock rate. The clock increment value enables the isochronous data rate to be derived from the reference clock rate at a decoder. The PES is packaged into a plurality of isochronous data transport packets such that a first payload byte of each transport packet is the first byte of an isochronous data presentation unit and a last payload byte of each of the packets is the last byte of an isochronous data presentation unit.

A presentation time-stamp (PTS) extension is provided in the isochronous data header to supplement a standard MPEG-2 PTS provided in the PES header. The combination of the PTS extension with the standard PTS enables the time resolution for presenting isochronous data presentation units at a decoder to be increased.

In an illustrated embodiment, the PTS extension is provided at the beginning of the isochronous data header. The PTS extension can be derived from the eight most significant bits of the standard MPEG-2 nine-bit PCR extension. The eight-bit PTS extension can be combined with MPEG's standard thirty-three-bit PTS to increase the time resolution of isochronous data presentation time-stamps from the MPEG-2 standard resolution of 11.1 microseconds (90 kHz) to 74 nanoseconds (13.5 MHz) for unambiguous determination of the correct presentation unit start time referenced by an isochronous data PTS.

In the illustrated embodiment, each isochronous data presentation unit comprises two eight-bit bytes, such that the presentation units comprise sixteen-bit words.

An increment value can be provided in the isochronous data header specifying the ratio of the isochronous data rate to a reference clock rate at the decoder.

A method is provided for recovering isochronous data transmitted in accordance with any one of the aforementioned methods. A PES header and an isochronous data header are located in a received data stream of isochronous data transport packets. Program clock reference (PCR) values are extracted from the isochronous data transport packets. The PCR values are used to recover the reference clock rate. The clock increment value is extracted from the isochronous data header, and used to derive the isochronous data rate from the reference clock rate. The isochronous data is recovered at the isochronous data rate.

The standard PTS is extracted from the PES header. The PTS extension is extracted from the isochronous data header. The extracted standard PTS and PTS extension are used to determine a correct time for commencing the presentation of the isochronous data presentation units contained in the received data stream. In the illustrated embodiment, the PTS extension is provided at the beginning of the isochronous data header, although it may alternatively be provided elsewhere. The PTS extension can be derived from the eight-most significant bits of the standard MPEG-2 nine-bit PCR extension.

Apparatus is provided for recovering isochronous data from an MPEG-2 type transport packet stream at high data rates in a manner which is robust to the loss of transport packets due to errors. Means are provided for locating a packetized elementary stream header and an isochronous data header in a received isochronous data transport packet stream. Means are also provided for extracting program clock reference (PCR) values from the isochronous data transport packet stream. Means responsive to said PCR values recover a reference clock rate. Means are provided for extracting a clock increment value from the isochronous data header. The extracted clock increment value and the recovered reference clock rate are processed to reproduce the isochronous data rate. Means responsive to the reproduced isochronous data rate recover the isochronous data.

Means are also provided for extracting a presentation time-stamp for the isochronous data from the PES header and for extracting a PTS extension for the isochronous data from the isochronous data header. Means responsive to the extracted PTS and PTS extension are provided for determining a correct time for commencing the presentation of isochronous data presentation units contained in the received data transport packet stream.

In one embodiment of the apparatus, the PTS extension is extracted from the beginning of the isochronous data header, and the isochronous data presentation units are each sixteen bits in length.

Receiver apparatus is provided for recovering information data from a data stream. The information is transmitted in the data stream at an information data rate. A direct digital synthesis clock provides a plurality of reference clock rates based on a system clock frequency. Means are provided for locating an information data header in a received information data transport packet stream. Means are also provided for extracting a clock increment value from the information data header. The clock increment value specifies the exact ratio of the information data rate to the frequency of a phase locked system clock. The DDS clock is responsive to the clock increment value for providing a clock signal at the information data rate for use in outputting the information data.

The increment value is provided as an integer. The data stream can comprise, for example, an MPEG-2 type transport packet stream. In such an embodiment, the nominal system clock frequency is 27 MHz. The increment value is the nearest integer to the product of the information data rate and a modulus value N divided by the nominal system clock frequency (i.e., 27,000,000). In a specific embodiment, the modulus value N=536,868,000. The integer increments, combined with the allowed 30 ppm variability from the MPEG nominal 27 MHz system clock frequency, provide a continuously variable clock generator for isochronous data support.

DETAILED DESCRIPTION OF THE INVENTION

Figure 1:
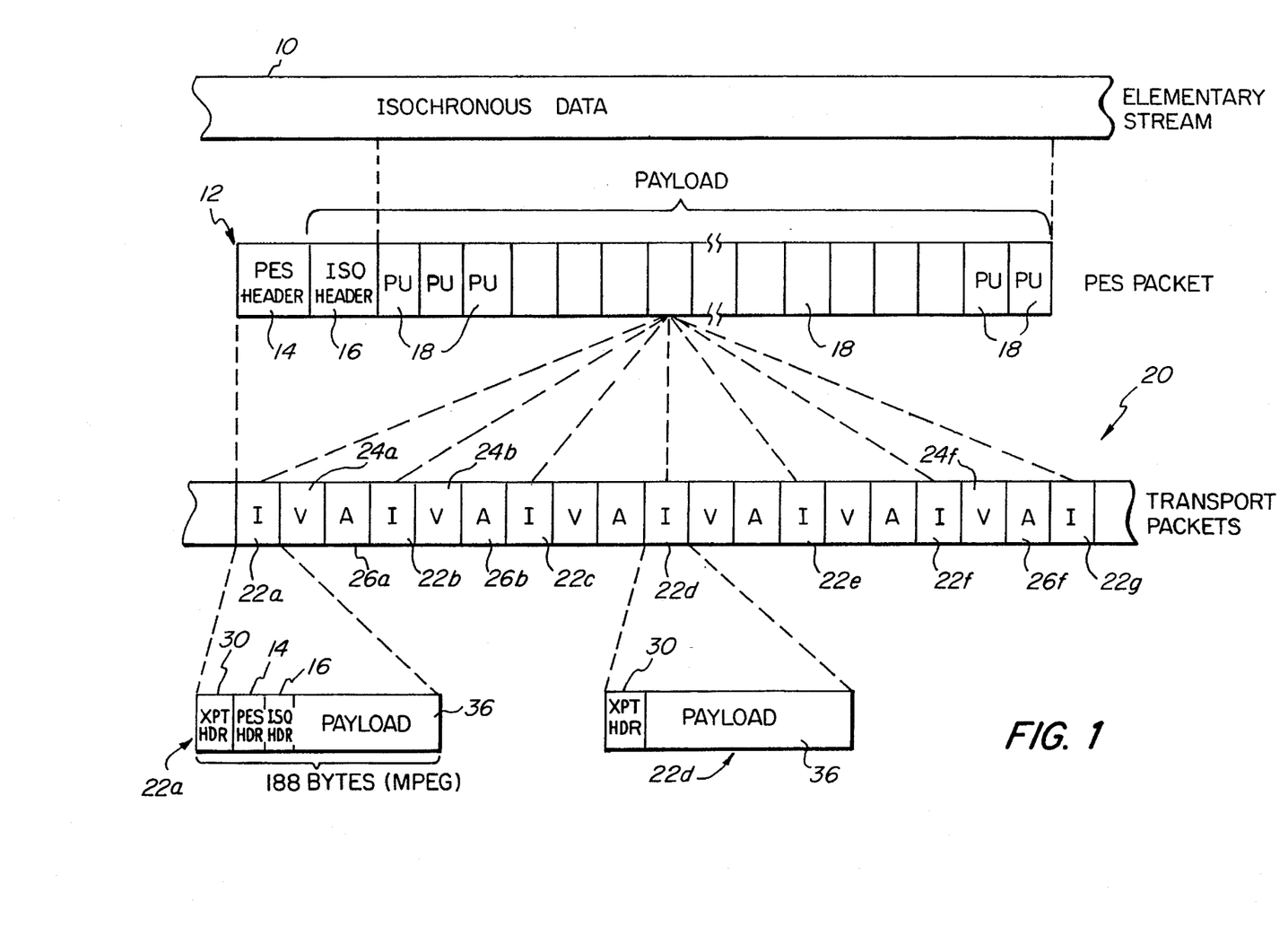
FIG. 1 is a diagrammatic illustration showing how elementary stream data is packaged into transport packets.

FIG. 1 is a diagrammatic illustration showing how different digital service components can be multiplexed into a stream of transport packets. Multiplexing is accomplished by packaging raw elementary streams such as coded video, audio and data into PES packets and then encapsulating these into transport packets. The figure is illustrative only, since a PES packet, such as packet 12 illustrated, may translate into more or less than the seven transport packets 22a–22g illustrated.

In the example of FIG. 1, an elementary stream generally designated 10 comprises a serial stream of data bits, such as the isochronous data shown. It should be appreciated that other types of data can be provided in the elementary stream for transmission in accordance with the present invention. Similar elementary streams will be provided for compressed video and audio data in accordance with the MPEG-2 transport standard.

The first step in forming a transport packet stream is to encapsulate the elementary stream for each type of data into a corresponding packetized elementary stream (PES) formed from successive PES packets, such as packet 12 illustrated. Each PES packet contains a PES header 14 followed by a PES payload containing a series of fixed length presentation units (PU) 18. The payload comprises the data to be communicated. The PES header 14 contains information useful in processing the payload data, such as the presentation time-stamp (PTS) in accordance with the MPEG-2 systems specification.

In accordance with the present invention, an isochronous data header (ISO header) 16 follows the PES header 14 as part of the PES packet payload. The presentation units 18 of the payload follow the ISO header 16. The ISO header is described in greater detail below.

The header and payload data from each PES packet is split into individual fixed length transport packets 22, 24, 26, each containing a transport header 30 and payload data 36. The payload data of each transport packet will contain a portion of the payload data (i.e., presentation units 18) of the corresponding PES packet 12 and may also contain the PES header 14 and ISO header 16, as illustrated at 22a. Transport packet 22d is another isochronous data transport packet in the transport packet multiplex 20. This transport packet includes a transport header 30 as well as payload 36. The payload does not include a PES'header or ISO header because this transport packet is derived from payload data that is subsequent to the PES header and ISO header in the PES packet. In other words, since there is only one PES header and one ISO header per PES packet, only the first transport packet derived from that PES packet will contain the PES header and ISO header. The payload segments of the remaining transport packets derived from the PES packet will contain only portions of the actual information data to be transmitted.

In accordance with the MPEG-2 systems specification, the transport packet headers 30 will contain the program identifier (PID) which distinguishes each transport packet stream, such as an isochronous data packet stream, a video packet stream, or an audio packet stream, from other packet streams. In FIG. 1, only the derivation of the isochronous data transport packets 22 is shown. In order to derive video packets 24 and audio packets 26, corresponding elementary streams (not shown) are provided which are encapsulated into PES packets and transport packets in essentially the same manner illustrated in FIG. 1 with respect to the formation of the isochronous data packets 22, except that the isochronous data header 16 of the present invention is not provided in the video or audio transport packets.

Each MPEG transport packet contains 188 bytes of data, formed from the transport header 30 of at least four bytes and payload data 36, which can be up to 184 bytes. In accordance with the MPEG-2 systems specification, an adaptation field of, e.g, eight bytes may be provided between the transport header 30 and payload 36. The variable length adaptation field can contain, for example, the program clock reference (PCR) used for synchronization of the decoder's system time clock.

The plurality of isochronous data packets 22a, 22b, 22c . . . 22g . . . , and other packets 24a–f . . . and 26a–f . . . is multiplexed as illustrated in FIG. 1 to form the transport stream 20 that is communicated over the communication channel from the encoder to the decoder. The purpose of the decoder is to demultiplex the different types of transport packets from the transport stream, based on the PID's of the individual packets, and to then selectively process each of the isochronous data, audio and video components for use in reconstructing a television signal and recovering a data stream represented by the isochronous data.

Figure 2:
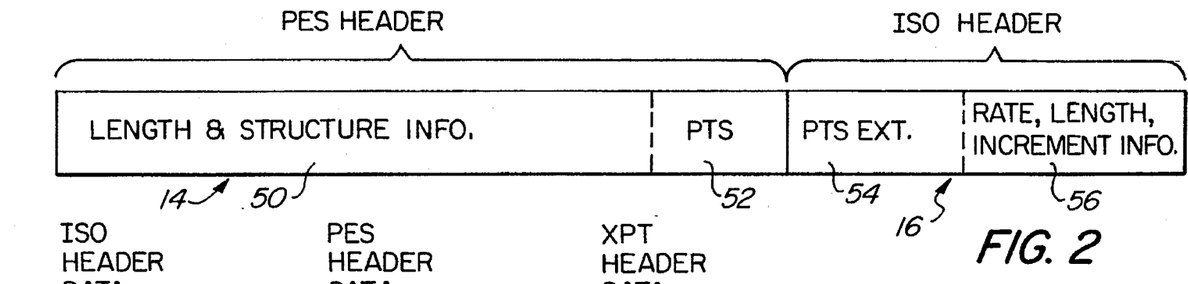
FIG. 2 illustrates the PES and isochronous data headers referred to in FIG. 1 in greater detail.

FIG. 2 illustrates the PES header 14 and ISO header 16 in greater detail. The PES header 14 includes various length and structure information 50 in accordance with the MPEG-2 systems specification. An optional PTS field 52 may follow the length and structure information 50. In the event a PTS is provided, a counterpart PTS extension is provided in the ISO header 16. As illustrated in FIG. 2, the PTS extension 54 is preferably provided at the beginning of the ISO header 16 such that it immediately follows the PTS 52 in the PES header. The present invention is not limited, however, to providing the PTS extension at the beginning of the ISO header. The PTS extension can be provided elsewhere in the ISO header, as long as it can be detected at the decoder for use in appending it to the PTS to extend the time resolution for presenting the isochronous data at the output of the decoder. By providing an additional eight bits, for example, in the PTS extension to be added to the thirty-three bits provided in the PTS specified in MPEG's systems specification, the standard MPEG-2 resolution of 11.1 microseconds can be extended to 74 nanoseconds for unambiguous determination of the correct presentation unit start time referenced by an extended isochronous data PTS.

The ISO header also includes various rate, length and increment information 56. More particularly, the rate, length and increment information will include a data rate flag, an isochronous data header length field, and an increment field specifying a ratio of the information data rate (e.g., the isochronous data rate) to a system clock frequency. This clock increment value enables a direct digital synthesis clock at a decoder to provide a clock signal at the information data rate for use in outputting information data carried by a data transport stream in accordance with the present invention.

In a preferred embodiment of the invention, each isochronous data presentation unit 18 (FIG. 1) is sixteen bits in length, i.e., one word of two eight-bit bytes. The isochronous data presentation units are aligned with the PES syntax in that the first byte of the isochronous data header immediately follows the last byte of the PES header. Isochronous data presentation units are aligned with transport packet payloads such that the first payload byte of an isochronous data transport packet is the first byte of an isochronous data presentation unit (following any adaptation, PES header and isochronous data header fields). The last byte of an isochronous data transport packet is the last byte of an isochronous data presentation unit.

The syntax of isochronous data in accordance with the present invention is described below using the formal grammar utilized by the MPEG-2 systems specification. The MPEG grammar is a C-language-like syntax and is a method of describing continuous and possibly variable rate sequences of bits, instead of specifying a procedural program and its functions as in the computer language C. The first column of the syntax contains the syntax element. The second column gives the length of the syntax element in bits and the third column identifies the syntax type. The types are bslbf (bit sequence left-most bit first) and uimsbf (unsigned integer most significant bit first). The notation "isochronous_data_header() { . . . }" indicates that the syntax elements within the braces are a named set and may be invoked elsewhere in the syntax by simply using the designation "isochronous_data_header()". A conditional occurrence of bit structures may be indicated with the usual "if" tests. The customary relational operators well known in the C-language are also available. Loop structures are possible and use the standard C loop syntax. The syntax table is accompanied by a set of semantics, providing definitions for each previously undefined syntax fields and placing constraints on their use. The following isochronous data bitstream syntax and bitstream semantics represent a preferred embodiment of the present invention:

Isochronous Data Sequence:

| Syntax: | No. of Bits: | Mnemonic: |
|---|---|---|
| isochronous_data_sequence{ | | |
|   Isochronous_data_header(){ | | |
|     for (i=0; i<N; i++){ | | |
|       Isochronous_data_presentation_unit | 16 | bslbf |
|   } | | |
| } | | |

Isochronous Data Header:
To constrain each isochronous data sequence to an even number of bytes, the last reserved field in the isochronous data header is specified to be an even number of bytes. The syntax for isochronous data headers is:

| Syntax: | No. of Bits: | Mnemonic: |
|---|---|---|
| isochronous_data_header{ | | |
| pts_ext8 | 8 | bslbf |
| data_rate_flag | 1 | bslbf |
| reserved | 3 | bslbf |
| isochronous_data_header_length | 4 | uimsbf |
| if (data_rate_flag){ | | |
| reserved | 4 | bslbf |
| increment | 28 | uimsbf |
| } | | |
| reserved | n | bslbf |
| } | | |

Isochronous Data Bitstream Semantics:
Isochronous Data Sequence:
Isochronous_data_presentation_unit—A 16 bit presentation unit of isochronous data where the first (left) bit is presented (output) before the second bit, etc.
Isochronous Data Header:
pts_ext8—An 8-bit field extending the PTS conveyed in the PES header of this PES. This field is the 8 most significant bits of the 9 bit PCR extension defined in the MPEG-2 systems specification, and is used in accordance with the present invention to extend the time resolution of isochronous data PTS's from the MPEG-2 systems specification resolution of 11.1 microseconds (90 kHz) to 74 nanoseconds (13.5 MHz) for unambiguous determination of the correct presentation unit start time referenced by an isochronous data PTS.

data_rate_flag—A one bit flag which, when set to "1", indicates that an increment field is present in the isochronous data header.

isochronous_data_header_length—A 4 bit field indicating the number of words (16 bits) of isochronous data header which follow this field including the reserved words, (units of 16 bits forces the isochronous data header to be an even number of bytes which, coupled with isochronous data presentation units, adaptation fields, and PES header also being an even number of bytes, allows isochronous data transport packets to be generated without any padding bytes and thus higher efficiency).

increment—A 28 bit field which indicates the isochronous data clock increment value and takes on a value that describes the exact ratio of the isochronous data rate to a phase locked reference clock, e.g., an MPEG-2 27 MHz reference. In a preferred embodiment, increment is:
increment=NINT(isochronous data rate *536,868,000/ nominal_system_clock_frequency); where:
nominal_system_clock_frequency is specified by MPEG as 27 MHz and "NINT" means "nearest integer." As noted above, MPEG allows a 30 ppm variability from the nominal system clock frequency.

reserved—An n-bit field of reserved words of which the decoder assumes no particular value.

Figure 3:
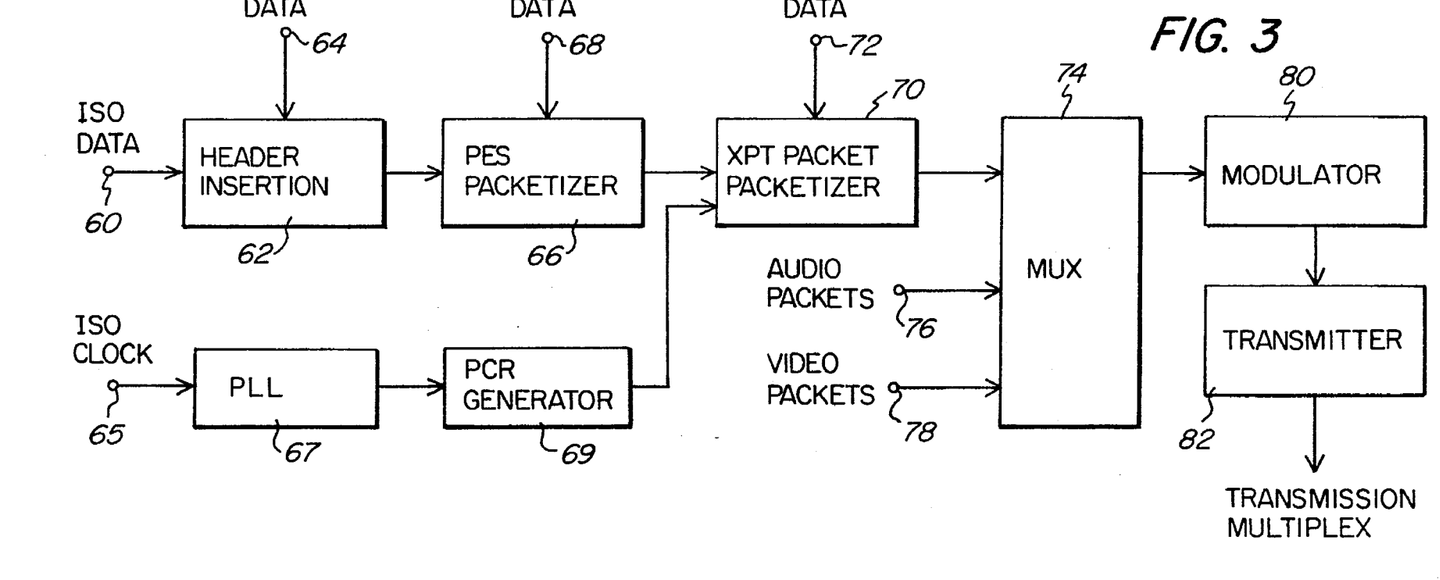
FIG. 3 is a block diagram of encoder apparatus for assembling the transport packets referred to in FIG. 1.

The block diagram of FIG. 3 illustrates a possible encoder for implementing the present invention. Isochronous data (e.g., from elementary stream 10—FIG. 1) is input via terminal 60 to a header insertion stage 62 which inserts the data required to assemble the ISO header 16. This data is obtained, for example, from a system microprocessor, not shown. The ISO data with the inserted ISO header is received by a PES packetizer stage 66 that inserts the PES header 14 which has been assembled from PES header data input via terminal 68. As with the ISO header data, the PES header data can be obtained from a system microprocessor or other data source as well known in the art.

An isochronous data clock signal is input via terminal 65 to a phase lock loop (PLL) 67 of the encoder of FIG. 3. The PLL can comprise, e.g., a 27 MHz oscillator and DDS circuit to lock to the input clock signal, using the nearest increment value as calculated above. PCR values are then generated by a PCR generator 69. The PCR values are input as transport adaptation data to a transport packet packetizer 70, described in further detail below.

Once the ISO header and PES header have been inserted into the isochronous data elementary stream, the subsequent payload data input via terminal 60 is segmented to follow the headers in the form of fixed length presentation units 18. The result is a succession of PES packets 12 which are output from PES packetizer 66 to the transport packet packetizer stage 70. At this point, data necessary to assemble the transport header is received via terminal 72 in a conventional manner and assembled into a transport header, to which counterpart payload data is appended. The payload data comprises the next portion of data (i.e., PES header data, ISO header data and/or presentation units) from the current PES packet(s). The output of packetizer 70 is a series of isochronous data transport packets 22 which will each comprise a transport header and payload and may or may not include PES header and isochronous data header information as part of the payload.

The isochronous data transport packets from packetizer 70 may be multiplexed with compressed audio packets and video packets input to a multiplexer 74 via terminals 76 and 78, respectively. The audio and video packets are provided in accordance with the MPEG-2 systems specification, as well known in the art. Multiplexer 74 assembles the transport packets into a transport packet stream 20 (as shown in FIG. 1). The transport packet stream is modulated in a conventional modulator 80 and transmitted by a conventional transmitter 82 via a satellite, cable or other known communication channel.

Figure 4:
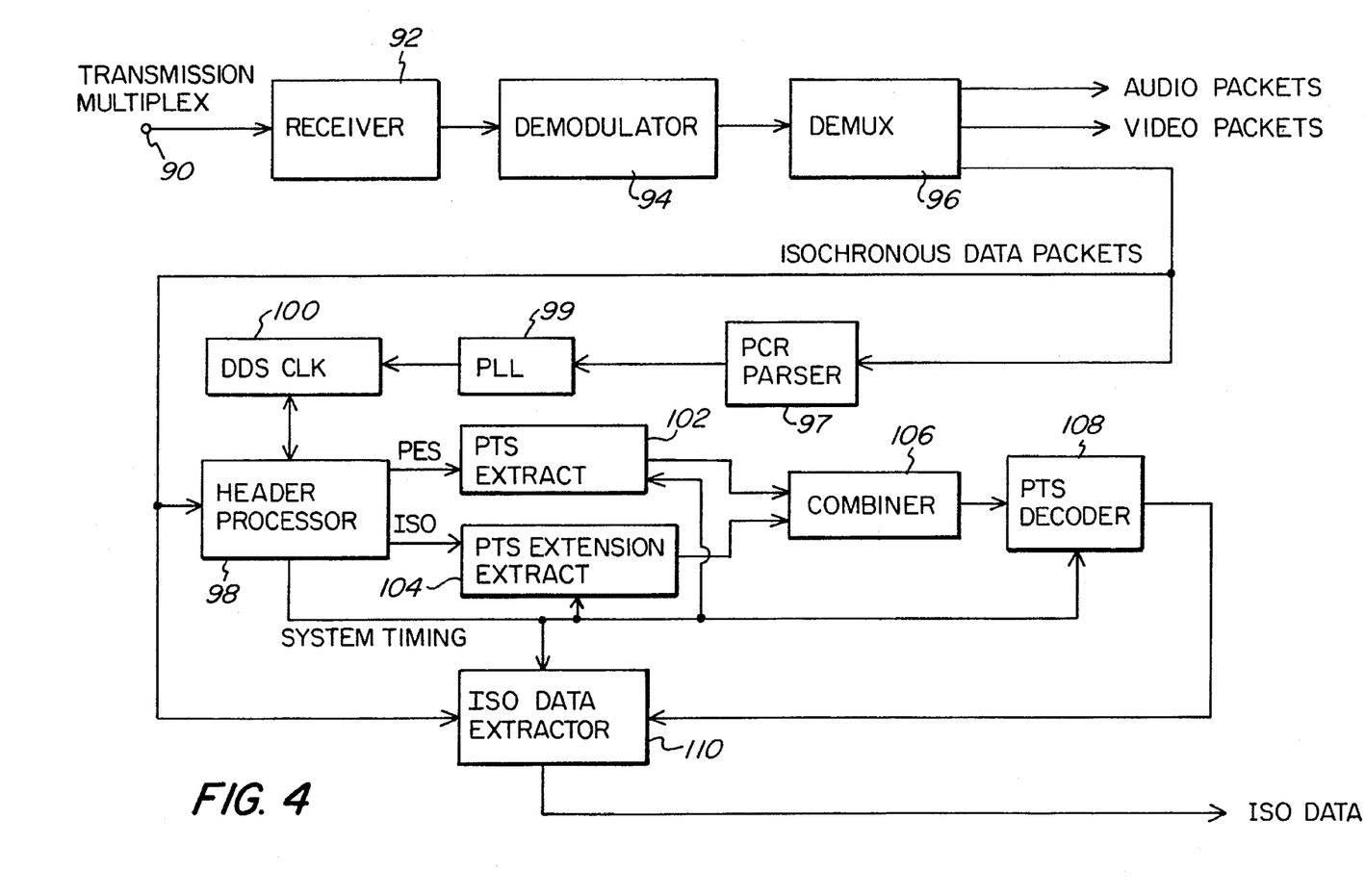
FIG. 4 is a block diagram of decoder apparatus for recovering the isochronous data carried by the transport packets.

FIG. 4 illustrates a receiver ("decoder") for the transmission multiplex output from the encoder of FIG. 3. The transmission multiplex is input to a decoder 92 via terminal 90, and demodulated in a conventional demodulator 94. A demultiplexer 96 recovers the audio packets, video packets and isochronous data packets from the demodulated transport packet stream. The isochronous data packets are input to a header processor 98 which can comprise a conventional microprocessor programmed to recover the PES header and ISO header from the isochronous data packet stream. The PTS is extracted from the PES header in a PTS extraction stage 102. The PTS extension provided in accordance with the present invention is extracted from the ISO header by a PTS extension extraction stage 104. The PTS and PTS extension are combined in a combiner 106 to provide the isochronous data PTS's that enable the high rate isochronous data to be accurately presented in time. A PTS decoder 108 extracts the timing information from the extended isochronous data PTS's output from combiner 106. This timing information is input to an isochronous data extractor 110 that also receives the isochronous data packets from demultiplexer 96. System timing information from the header processor 98 enables the extraction stages 102, 104, the PTS decoder 108 and the isochronous data extractor 110 to properly locate and process the data presented to each stage. The ISO data extractor 110 responds to the PTS's from PTS decoder 108 in order to present the individual isochronous data presentation units (the recovered "ISO data") at the appropriate time. The presented ISO data is output from ISO data extractor 110 for use in providing a desired service based on the information embodied in the data.

The decoder of FIG. 4 also includes a DDS clock 100 that is used to provide a plurality of reference clock rates used by the header processor and/or other components of the decoder. The system timing output from header processor 98 is based on one or more of the reference clock rates provided by the DDS clock. These reference clock rates are based on a system clock frequency, for example, the 27 MHz system clock frequency set forth in the MPEG-2 systems specification. In order to process PCRs to generate the system clock frequency for use by the DDS, the decoder includes a PCR parser 97 that extracts PCR values from isochronous data transport packets. The extracted PCR values are used to lock a phase lock loop 99 that generates the system clock (e.g., 27 MHz). The system clock is input to the DDS clock 100 for use in generating the reference clock rates described above.

In order to simplify the decoder, a clock "increment" is provided in the isochronous data header to specify the ratio of the isochronous data rate to the system clock frequency. This increment is recovered by the header processor 98 and input to the DDS clock 100, which uses the increment to provide a clock signal at the isochronous data rate for use in presenting the isochronous data.

The provision of a clock increment in the isochronous data header obviates the need for the decoder to have to compute this increment on its own. In conventional systems using a direct digital synthesis clock, the decoder receives a required clock frequency indicator with the data to be recovered. The clock frequency indicator specifies the actual clock frequency that is to be synthesized by the DDS clock. Since the DDS clock scales an existing system clock in order to produce various fixed clock frequencies, conventional decoders must first determine the ratio of the desired clock frequency to the system clock frequency from which the desired clock frequency is to be derived. The processing hardware necessary to perform this function adds cost and complexity to the decoder.

In a digital television decoder, cost must be kept to a minimum since a separate decoder will be required for each of the potentially millions of televisions in the field. By providing the decoder with an increment that can be directly used by the DDS clock to produce the desired frequency, the receiver complexity and cost is reduced. In the system of the present invention, the computation of the increment necessary to provide the desired frequency is done centrally at the encoder, which serves the millions of decoders in the field. The decoders therefore do not need to perform this computation.

It should now be appreciated that the present invention provides a method and apparatus for communicating information data, such as isochronous data, in an MPEG-2 type transport stream. The isochronous data follows a PES header in the payload portion of a packetized elementary stream. The PES payload begins with an isochronous data header which is followed by isochronous data presentation units. In the preferred embodiment, the presentation units are sixteen bits in length. The presentation units are aligned with the packetized elementary stream, with the first byte of the isochronous data header following the last byte of the PES header. The isochronous data presentation units are also aligned with the transport packets which carry them. In particular, the first payload byte of a transport packet is the first byte of an presentation unit. The last byte of a transport packet is the last byte of an presentation unit. A unique isochronous data bitstream syntax is provided to implement the present invention. The syntax provides a clock increment in the isochronous data header in order to describe the ratio of the isochronous data rate to a system reference, thereby providing additional information to the decoder that enables the receiver complexity and cost to be reduced.

Although the invention has been described in connection with a preferred embodiment, it should be appreciated that numerous adaptations and modifications may be made thereto without departing from the spirit and scope of the invention as set forth in the claims.

We claim:

1. A method for the robust transmission of high rate isochronous data in an MPEG-2 type transport stream, comprising the steps of:

providing said isochronous data in a packetized elementary stream (PES) having a PES header preceding a PES payload, said PES payload including an isochronous data header followed by a plurality of isochronous data presentation units;

aligning said isochronous data header and the presentation units which follow within said PES such that the first byte of the isochronous data header immediately follows the last byte of the PES header;

inserting a clock increment value in said isochronous data header specifying the ratio of said isochronous data rate to a reference clock rate, said clock increment value enabling said isochronous data rate to be derived from said reference clock rate at a decoder; and packaging said PES into a plurality of isochronous data transport packets such that a first payload byte of each transport packet is the first byte of an isochronous data presentation unit and a last payload byte of each of said packets is the last byte of an isochronous data presentation unit.

2. A method in accordance with claim 1 comprising the further step of:

providing a presentation time-stamp (PTS) extension in said isochronous data header to supplement a standard MPEG-2 PTS provided in said PES header, the combination of said PTS extension with the standard PTS enabling the time resolution for presenting isochronous data presentation units at said decoder to be increased.

3. A method in accordance with claim 2 wherein said PTS extension is provided at the beginning of said isochronous data header.

4. A method in accordance with claim 3 wherein said PTS extension is an eight bit extension derived from the eight most significant bits of the standard MPEG-2 nine bit PCR extension.

5. A method in accordance with claim 4 wherein said eight bit PTS extension is combined with a standard 33-bit PTS to increase said time resolution from about 11.1 microseconds to about 74 nanoseconds.

6. A method in accordance with claim 5 wherein said isochronous data presentation units are each sixteen bits in length.

7. A method in accordance with claim 1 wherein said isochronous data presentation units are each sixteen bits in length.

8. A method for recovering isochronous data transmitted in accordance with the method of claim 1 comprising the steps of:

locating a PES header and an isochronous data header in a received data stream of said isochronous data transport packets;

extracting program clock reference (PCR) values from said isochronous data transport packets;

using said PCR values to recover said reference clock rate;

extracting said clock increment value from said isochronous data header;

using said extracted increment value to derive said isochronous data rate from said reference clock rate; and recovering said isochronous data at said isochronous data rate.

9. A method in accordance with claim 8 wherein prior to transmission of said high rate isochronous data in said MPEG-2 type transport stream, a presentation time-stamp (PTS) extension is provided in said isochronous data header to supplement a standard MPEG-2 PTS provided in said PES header, the combination of said PTS extension with the standard PTS enabling the time resolution for presenting isochronous data presentation units at said decoder to be increased, said method for recovering the isochronous data comprising the further steps of:

extracting said standard PTS from said PES header;

extracting said PTS extension from said isochronous data header; and using the extracted standard PTS and PTS extension to determine a correct time for commencing the presentation of the isochronous data presentation units contained in said received data stream.

10. A method in accordance with claim 9 wherein said PTS extension is provided at the beginning of said isochronous data header.

11. A method in accordance with claim 10 wherein said PTS extension is derived from the eight most significant bits of the standard MPEG-2 nine bit PCR extension.

12. A method in accordance with claim 11 wherein said isochronous data presentation units are each sixteen bits in length.

13. A method in accordance with claim 1 comprising the further step of inserting PCR values into said isochronous data transport packets for use by said decoder in recovering said reference clock rate.

14. Apparatus for recovering isochronous data carried at an isochronous data rate in an MPEG-2 type transport stream comprising:

means for locating a packetized elementary stream (PES) header and an isochronous data header in a received isochronous data transport packet stream;

means for extracting program clock reference (PCR) values from said isochronous data transport packet stream;

means responsive to said PCR values for recovering a reference clock rate;

means for extracting a clock increment value from said isochronous data header;

means for processing said extracted clock increment value and the recovered reference clock rate to reproduce said isochronous data rate; and means responsive to the isochronous data rate reproduced by said processing means for recovering said isochronous data.

15. Apparatus in accordance with claim 14 further comprising:

means for extracting a presentation time-stamp (PTS) for the isochronous data from said PES header;

means for extracting a PTS extension for the isochronous data from said isochronous data header; and means responsive to said extracted PTS and PTS extension for determining a correct time for commencing the presentation of isochronous data presentation units contained in said received data transport packet stream.

16. Apparatus in accordance with claim 15 wherein said PTS extension is extracted from the beginning of said isochronous data header.

17. Apparatus in accordance with claim 15 wherein said isochronous data presentation units are each sixteen bits in length.

18. Decoder apparatus for recovering information data from a data stream, said information being transmitted in said data stream at an information data rate, comprising:

a direct digital synthesis (DDS) clock for providing a plurality of reference clock rates based on a system clock frequency;

means for locating an information data header in a received information data transport packet stream; and means for extracting a clock increment value from said information data header, said clock increment value specifying the ratio of said information data rate to said system clock frequency;

wherein said DDS clock is responsive to said clock increment value for providing a clock signal at said information data rate for use in outputting said information data.

19. Apparatus in accordance with claim 18 wherein said increment value is an integer.

20. Apparatus in accordance with claim 19 wherein:

said data stream is an MPEG-2 type transport stream;

said system clock frequency is about 27 MHz; and said increment value is the nearest integer to the product of the information data rate and a modulus value N divided by 27,000,000.

21. Apparatus in accordance with claim 20 wherein said modulus value N=536,868,000.

22. Apparatus in accordance with claim 18 wherein:

said system clock frequency has a range of tolerance enabling said DDS clock to generate a substantially continuous range of reference clock rates from a system clock to recover information at any information rate within said substantially continuous range.

* * * * *